US008758212B2

(12) United States Patent
Al-Mehthel et al.

(10) Patent No.: US 8,758,212 B2
(45) Date of Patent: *Jun. 24, 2014

(54) DISPOSAL OF SULFUR THROUGH USE AS SAND-SULFUR MORTAR

(71) Applicants: Saudi Arabian Oil Company, Dhahran (SA); King Fahd University of Petroleum and Minerals, Dhahran (SA)

(72) Inventors: Mohammed Al-Mehthel, Dhahran (SA); Mohammed Maslehuddin, Dhahran (SA); Saleh Al-Idi, Al-Khobar (SA); Mohammed Rizwan Ali, Al-Khobar (SA); Mohammed Salihu Barry, Thoqba (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 13/751,969

(22) Filed: Jan. 28, 2013

(65) Prior Publication Data

US 2013/0192496 A1   Aug. 1, 2013

Related U.S. Application Data

(60) Provisional application No. 61/591,488, filed on Jan. 27, 2012.

(51) Int. Cl.
*C04B 28/36* (2006.01)
*B09B 3/00* (2006.01)

(52) U.S. Cl.
USPC ............... 588/252; 106/286.1; 106/287.32; 106/815

(58) Field of Classification Search
USPC ............... 106/815, 286.1, 287.32; 588/252
See application file for complete search history.

(56) References Cited

U.S. PATENT DOCUMENTS

| 4,188,230 | A | * | 2/1980 | Gillott et al. | 501/140 |
| 4,376,831 | A | * | 3/1983 | Woo | 501/140 |
| 4,428,700 | A | * | 1/1984 | Lennemann | 405/129.45 |
| 7,335,253 | B2 | * | 2/2008 | Mesters et al. | 106/768 |
| 7,833,341 | B2 | * | 11/2010 | Antens et al. | 106/287.1 |
| 8,137,456 | B2 | * | 3/2012 | Van Trier et al. | 106/815 |
| 8,323,395 | B2 | * | 12/2012 | Verbist et al. | 106/287.19 |
| 2007/0186823 | A1 | * | 8/2007 | Van Trier et al. | 106/806 |

FOREIGN PATENT DOCUMENTS

| CA | 1182944 A1 | 2/1985 |
| SU | 1950637 A * | 5/1991 |
| WO | WO 2010/085165 A1 * | 7/2010 |

OTHER PUBLICATIONS

Moneer Fouad Tewfik, "Basic Properties of Sulfur-Sand Composites With and Without Fillers", The Arabian Journal for Science and Engineering, 1982, pp. 21-25, vol. 7, No. 1, XP009170778.
Kazuto et al., "Sulfur-containing structural material with high mechanical strength", Chemical Abstracts, Feb. 10, 1975, p. 226, vol. 82, No. 6, Columbus OH, USA, XP000185797.
International Search Report and Written Opinion for Related PCT Application PCT/US2013/023162, Jul. 11, 2013.

* cited by examiner

*Primary Examiner* — Anthony J Green
(74) *Attorney, Agent, or Firm* — Bracewell & Giuliani LLP; Constance G. Rhebergen; James M. Sellers

(57) ABSTRACT

A sulfur-sand limestone mortar and methods of preparing the sulfur-sand limestone mortar and disposing of elemental sulfur, are disclosed. In embodiments, the sulfur-sand limestone mortar includes elemental sulfur, limestone powder, and sand. Modifiers, such as plasticizers, are not required and are not used in embodiments of the sulfur-sand limestone mortar. In embodiments of the method to prepare the sulfur-sand limestone mortar, each of the elemental sulfur, limestone powder, and sand are heated to at least 140 C, then combined, and then allowed to solidify.

11 Claims, No Drawings

DISPOSAL OF SULFUR THROUGH USE AS SAND-SULFUR MORTAR

CROSS-REFERENCE TO RELATED PATENT APPLICATIONS

This application claims priority to U.S. Provisional Patent Application No. 61/591,488 titled "Disposal of Sulfur Through Use as Sand-Sulfur Mortar," filed on Jan. 27, 2012, the disclosure of which is incorporated herein by reference in its entirety.

BACKGROUND OF THE INVENTION

1. Field of the Invention

The present invention relates to a composition and method for disposing of sulfur by converting waste sulfur to a useful product, namely, by producing a sulfur based mortar.

2. Description of the Related Art

Typical cement concrete is a mixture of Portland cement, sand, aggregates, and water. Such Portland cement concrete can be used for a variety of purposes including the construction of buildings. The Portland cement is the binder that binds the concrete together. Unfortunately, the production of Portland cement is energy intensive because production consumes significant energy and, thus, produces considerable carbon dioxide ($CO_2$). Indeed, the production of Portland cement includes heating cement clinker to 1400-1500 C, in a rotating kiln. In addition to the environmental issues, the heat required to produce cement clinker is a health and safety risk. Such energy consumption during production causes concerns about using it as a building material. Sulfur, which is abundantly produced by oil refineries, can be used as an alternative binder in concrete.

Conventional sulfur concrete contains amounts of sulfur (as a binder), aggregates, sand, and fly ash. Fly ash, which is a waste product from the combustion of coal at thermal power plants, is used as a filler material, Fly ash, however, is not always readily available. Furthermore, fly ash can be relatively expensive because of demand for fly ash for use in Portland cement concrete. The cost and unavailability of fly ash discourages the use of sulfur concrete in building components.

There are other disadvantages to the use of conventional sulfur concrete. For example, polymer modifiers are typically needed as a modifier to increase the ductility of sulfur concrete, but such modifiers significantly increase the cost of sulfur concrete. Another disadvantage is that sulfur concrete prepared with conventional aggregate, such as gravel and rock, shows signs of deterioration when exposed to water and sulfuric acid. Therefore, it would be beneficial to have a sulfur concrete that eliminates the use of fly ash and polymer modifiers.

SUMMARY OF THE INVENTION

Embodiments of the present invention include a sulfur-sand limestone mortar, a method of preparing the sulfur-sand limestone mortar, and a method for disposing of elemental sulfur. Specifically, embodiments include a sulfur concrete mix incorporating sand that utilizes limestone powder. An embodiment of the mixture includes about 72.5% sand, 17.5% sulfur, and 10% limestone powder as filler. Experimental data shows that embodiments of the sulfur-sand limestone mortar exhibit good performance when exposed to water and sulfuric acid. The properties of embodiments of the sulfur-sand limestone mortar are comparable or better than those of sand-cement mortar and sulfur mix with fly ash. Furthermore, limestone powder can be more readily available and less expensive than fly ash.

Embodiments of the sulfur-sand limestone mortar can be used for preparing structural components, such as, for example, pavement slabs and tiles for flooring purposes. Also, embodiments of the sulfur-sand limestone mortar can be used as an acid-resistant flooring and fair coat. Furthermore, sulfur is a by-product of oil production that must be disposed of. In embodiments, sulfur-sand limestone mortar can be used as a method to dispose of sulfur in an environmentally friendly manner.

In embodiments, a sulfur mortar composition includes elemental sulfur; limestone powder; and sand; the elemental sulfur being heated to a liquid state and the limestone powder and the sand each being heated to at least 140 C and then combined to create a liquid state mortar composition, and then the elemental sulfur solidifying as it cools to create a solid state mortar composition.

In embodiments, at least a portion of the limestone powder has a fineness that allows it to pass through No. 100 sieve. In embodiments, the composition can include, by weight, about 70-75% sand. In embodiments, the composition can include, by weight, about 15-20% elemental sulfur. In embodiments, the composition can include, by weight, about 10-15% limestone powder. In embodiments, the composition can include, by weight, about 70-75% sand, 15-20% elemental sulfur, and 10-15% limestone powder. In embodiments, the composition can include, by weight, about 72.5% sand, 17.5% elemental sulfur, and 10% limestone powder.

In embodiments, the composition can have an absence of fine entrained gas cells. In embodiments, the composition can have an absence of modifiers and, more specifically, embodiments can have an absence of platicizers. In its liquid state, the composition can have sufficient flowability to occupy formworks when it is poured. The composition, in the solid state, can be stable in water. When in the solid state, embodiments of the composition absorb less than 1% water by weight.

In embodiments of a method for producing a sulfa mortar composition, the method includes the steps of heating elemental sulfur to a liquid state, heating each of limestone powder and sand to at least 140 C, combining the liquid-state elemental sulfur with each of the heated limestone powder and sand to define a mortar mixture, and cooling the mortar mixture until it solidifies.

In embodiments of a method for disposing of elemental sulfur, method includes the steps of heating elemental sulfur to a liquid state, heating each of limestone powder and sand to at least 140 C, combining the liquid-state elemental sulfur with each of the heated limestone powder and sand to define a mortar mixture, and cooling the mortar mixture until it solidifies. The elemental sulfur can be obtained as a by-product of mineral production.

DETAILED DESCRIPTION OF THE INVENTION

Solid sulfur can be produced as a by-product of oil and gas production. As one of ordinary skill will appreciate, elemental sulfur (S°) is a molecule containing only sulfur atoms (as opposed to, for example, a sulfate, such as $SO_4$). Elemental sulfur can have a yellow color when in crystalline form. Elemental sulfur can be produced as a byproduct when sulfur contaminants are removed when refining petroleum and natural gas. The sulfur can melt at temperatures in the range of about 127° C. to about 149° C. (260° to 300° F.). In an embodiment of the present invention, elemental sulfur is disposed of through a process that includes heating the sulfur to a molten state and then combining it with limestone powder and sand. In one embodiment of the present invention, a sulfur-sand limestone mortar ("SSLM") mix can include elemental sulfur, limestone powder, and sand.

Limestone powder is produced from limestone, such as by crushing limestone. Limestone can be a crystalline form of calcium carbonate ($CaCO_3$). The limestone powder is a fine powder having relatively uniform particle sizes or having various particles sizes. In one embodiment, the limestone powder can be finer than 150 micro meters, thus passing a No. 100 sieve. In one embodiment, the limestone powder improves the plasticity of the SSLM mixture, dilutes the sulfur concentration, and makes it less viscous. In one embodiment, the limestone powder can have the composition shown in Table 1.

TABLE 1

Composition of Exemplary Embodiment of Limestone Powder

| Constituent | Weight, % |
|---|---|
| CaO | 45.7 |
| $SiO_2$ | 11.8 |
| $Fe_2O_3$ | 0.68 |
| $Al_2O_3$ | 2.17 |
| MgO | 1.8 |
| LOI | 35.1 |

In one embodiment, the limestone powder does not impact the resistance of SSLM to water or acid, whereas limestone aggregates can have a negative impact. The limestone powder can act as a blender and finer. The limestone powder is also chemically bound with sulfur and therefore be protected from the fluids such as water and acid. Conventional limestone aggregate, in contrast, is directly exposed to the acid formed as a result of reaction between sulfur and water and, thus, be prone to attack by water. In various embodiments, the percentage of limestone powder can be limited to the range of about 10% to about 12.5%, as opposed to conventional sulfur concrete which can have about 47% limestone aggregate. For purposes of this specification, composition percentages indicate percentage by weight, unless otherwise indicated. Furthermore, limestone powders are less susceptible to soundness loss or loss on abrasion than the limestone aggregates. (Soundness loss test is applicable to samples retained on sieve no. 50 (300 micro meters) or larger and the loss on abrasion test is applicable to samples retained on number 8 sieve (2.36 mm) or larger).

Sand can be classified as rolled sand or dune sand. Dune sand is a type of wind-carried sand that has been piled up by the wind into a sand dune and can have rounded mineral grains. Dune sand or rolled sand can include mineral grains having diameters ranging from 0.1 to 1 mm. The sand can be used as fine aggregate in the SSLM. In one embodiment, the sand used as fine aggregate can be finer than 0.6 mm. In one embodiment, the fine aggregate can be quartz sand. The mineral grains can be quartz or other minerals.

In one embodiment, fine aggregate such as quartz sand is not vulnerable or is less vulnerable to damage due to, among other reasons, the fact that it is mostly quartz and finer than 0.6 mm. Acids have very low reaction on quartizitic material. Moreover, because the quartz sand is very fine, it can blend with the sulfur and limestone to form a dense matrix. The results are different if coarse sand or carbonate sand is used. Also, the carbonate-based sand, being alkaline in nature, could react with the acid formed due to the reaction of sulfur with water. Indeed, carbonate-based sand could react with the sulfuric acid produced by sulfur in the presence of moisture leading to cracking of specimens. The composition of sand for one embodiment of the SSLM is shown in Table 2.

TABLE 2

Composition of Exemplary Embodiment of Fine Aggregate

| Constituent | Weight, % |
|---|---|
| $SiO_2$ | 80-98 |
| $Fe_2O_3$ | 0.3-0.9 |
| $Al_2O_3$ | 0.6-4.0 |
| MgO | 0.3-1.0 |
| CaO | 0.2-7.0 |

The size gradation of sand for embodiments of the SSLM are shown in Table 3.

TABLE 3

Size Gradation of Exemplary Embodiment of Fine Aggregate Sand

| Sieve size (Nominal Opening, mm) | % passing |
|---|---|
| No 4 (4.75 mm) | 100 |
| No 8 (2.40 mm) | 100 |
| No 16 (1.20 mm) | 100 |
| No 30 (0.60 mm) | 96.2 |
| No 50 (0.30 mm) | 61.4 |
| No 100 (0.15 mm) | 21.9 |
| No 200 (0.075 mm) | 1.0 |

The mixture created by combining molten sulfur, limestone powder, and sand can be used as a sulfur mortar. Sulfur concrete and sulfur mortar are each created by combining molten sulfur and one or more of aggregates, sand, and filler. The sulfur, once solidified, can serve as the binder in the sulfur concrete or sulfur mortar. The size of the aggregate can determine whether the composition is concrete or mortar, as mortar typically has small aggregate particles such as sand.

In one embodiment of the present invention, a sulfur-sand-limestone mortar ("SSLM") mix can include elemental sulfur, sand, and limestone powder. Some embodiments do not use any polymer modifiers. The elemental sulfur can be, for example, the $S_8$ allotrope. Other allotropes of sulfur can be used, including S6, S7, S9-S15, S18, or S20. The sand can be quartz sand and can be dune sand or rolled sand. The limestone powder can be fine limestone powder such as, for example, finer than 150 micro meters (and thus passing a No. 100 sieve). The SSLM mix is prepared as a liquid by heating the elemental sulfur to at least 140 C to create a liquid state, and heating each of the limestone powder and the sand to at least 140 C. The liquid-state sulfur, the heated limestone powder, and the sand can then be combined such that the solids are suspended in the liquid sulfur. When the liquid sulfur cools, it can create a solid state SSLM.

One embodiment of sulfur-sand mortar can include about 70-75% sand, 15-20% sulfur, and 10-15% limestone powder. Some embodiments have an absence of modifiers. One embodiment can include 15-17.5% sulfur. One embodiment can include 82.5% dune sand. One embodiment can include 17.5% sulfur, 72.5% sand, 10% limestone powder, and an absence of polymer modifiers.

Each of the embodiments can have an absence of modifiers, such as chemical modifiers (including plasticizers, viscosotiers, and rheological modifiers) and air. in one embodiment, fine entrained gas cells are not intentionally introduced into the SSLM and, thus, the SSLM has an absence of fine entrained gas cells. This differs from state of the art methods which intentionally create fine entrained cells as a necessary step in creating sulfur concrete. Chemical modifiers are modifiers that are added to conventional sulfur mortar to alter the properties of the sulfur mortar. Examples of chemical modifiers that are used in conventional sulfur concrete, but not in embodiments of SSLM, can include dicyclopentadiene (DCPD); DCPD and an oligomer of cyclopentadiene; limonene; styrene; DCPD and styrene; naphthalene; olefinic hydrocarbon polymers; bitumen; 5-ethylidene-2-norbornene; and Chempruf™.

SSLM is more stable in moist and acidic environments than sulfur-sand mortar prepared with a commercial polymer modifier. Indeed, SSLM can be stable in applications in which it is exposed to or submerged in water for an extended period of time. Similarly, SSLM can be stable in applications in which it is exposed to or submerged in acid for an extended period of time.

Prior to solidifying, SSLM can have better moldability than sulfur concrete that does not include limestone powder. In one embodiment, the SSLM can have increased flowability, which can make it easier to pour than sulfur mortar that does not include limestone powder. In one embodiment, the SSLM, in its liquid state, has sufficient flowability to occupy formworks when it is poured. Embodiments using fine limestone powder can be more workable than embodiments that do not use fine limestone powder such as sulfur concrete having coarse limestone aggregate or not having any limestone. SSLM can be as durable or more durable than conventional sulfur mortar. Without being bound to any theory, it is believed that the fine limestone powder mitigates crack propagation within sulfur mortar, thereby promoting the durability of the SSLM. Entrained gas cells are not required for such mitigation of crack propagation.

Sulfur, such as elemental sulfur, can be produced as a by-product when refining hydrocarbons such as crude oil. Some types of crude oil, known as sour crude, can have more than 0.5% sulfur, The sulfur removed from crude oil must be stored or disposed of. In embodiments, the sulfur is disposed of by incorporating it into SSLM.

In various embodiments, SSLM is used in applications that are not exposed to temperatures greater than 120 degrees C. In one embodiment, SSLM is used as an acid-resistant coating in applications such as flooring, fair coat on walls, structural columns and beams, and process equipment. In one embodiment, SSLM is used in applications in which the SSLM is exposed to water for an extended period of time. SSLM, including SSLM made without plasticizers or other modifiers, can be stable in water in the solid state. In one embodiment, SSLM, in the solid state, absorbs less than 1% water by weight.

Referring to Table 4, the deterioration in water of an embodiment of SSLM concrete is compared to concrete made with limestone aggregate, dune sand, limestone powder, and sulfur.

TABLE 4

Water Stability Comparison

| # | Coarse aggregate, type and content in the mix (%) | Fine aggregate, type and content in the mix (%) | Filler, type and content in the mix (%) | Sulfur (%) | Modifier (%) | Days until deteriorated in water |
|---|---|---|---|---|---|---|
| 1 | Limestone 47 | Dune sand 28 | Limestone powder 10 | 12.5 | 2.5 | Less than 4 |
| 2 | Limestone 47 | Dune sand 28 | Limestone powder 10 | 15 | 0 | Less than 58 |
| 3 | Limestone 47 | Dune sand 28 | Fly ash 10 | 10 | 2.5 | Less than 133 |
| 4 | None | Dune sand 72.5 | Limestone powder 10 | 17.5 | 0 | More than 600 |

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within the said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. A method for disposing of elemental sulfur comprising the steps of:
    heating elemental sulfur to a liquid state, where the temperature of the liquid-state elemental sulfur is in a range of from about 127° C. to about 149° C.;
    heating each of limestone powder and sand to at least 140° C. but no greater than about 149° C.;
    combining the liquid-state elemental sulfur with each of the heated limestone powder and sand such that the temperature does not exceed about 149° C. to define a mortar mixture; and
    solidifying the mortar mixture through cooling,
    where the composition has an absence of fine entrained gas cells, and
    where the composition has an absence of modifiers.

2. The method according to claim 1, wherein the mortar mixture comprises about 70-75% sand, 15-20% elemental sulfur, and 10-15% limestone powder.

3. The method according to claim 1, further comprising the step of flowing the mortar mixture, in the liquid state, into contact with a formwork.

4. The method according to claim 1, wherein the elemental sulfur encapsulates the limestone powder.

5. The method of claim 1 where the sand comprises about 70-75% of the composition.

6. The method of claim 1 where at least a portion of limestone powder has a fineness that allows it to pass through No. 100 sieve.

7. The method of claim 1 where the composition comprises about 15-20% elemental sulfur.

8. The method of claim 1 where the composition comprises about 10-15% limestone powder.

9. The method of claim 1 where the composition comprises about 72.5% sand, 17.5% elemental sulfur, and 10% limestone powder.

10. The method of claim 1 where the sand is finer than 0.6 mm.

11. The method of claim 1 where the sand is dune sand.

\* \* \* \* \*